(12) United States Patent
Acar

(10) Patent No.: US 11,497,352 B1
(45) Date of Patent: Nov. 15, 2022

(54) GRINDER

(71) Applicant: Atilla Acar, Camarillo, CA (US)

(72) Inventor: Atilla Acar, Camarillo, CA (US)

(*) Notice: Subject to any disclaimer, the term of this patent is extended or adjusted under 35 U.S.C. 154(b) by 0 days.

(21) Appl. No.: 16/933,218

(22) Filed: Jul. 20, 2020

Related U.S. Application Data

(60) Provisional application No. 62/875,792, filed on Jul. 18, 2019.

(51) Int. Cl.
*A47J 42/40* (2006.01)
*A47J 42/24* (2006.01)

(52) U.S. Cl.
CPC .............. *A47J 42/40* (2013.01); *A47J 42/24* (2013.01)

(58) Field of Classification Search
CPC .. A47J 42/12; A47J 42/20; A47J 42/24; A47J 42/14; A47J 42/38; A47J 42/40
See application file for complete search history.

(56) References Cited

U.S. PATENT DOCUMENTS

| | | | | |
|---|---|---|---|---|
| 9,681,777 | B1* | 6/2017 | Dukat | B02C 18/18 |
| 2010/0147888 | A1* | 6/2010 | Gold | G01F 11/24 |
| | | | | 220/575 |
| 2012/0168544 | A1* | 7/2012 | Chaoui | A47J 42/24 |
| | | | | 241/68 |
| 2014/0353412 | A1* | 12/2014 | Grumbacher | A24C 5/40 |
| | | | | 241/70 |
| 2015/0298136 | A1* | 10/2015 | Dukat | A47J 42/14 |
| | | | | 241/24.1 |
| 2018/0126386 | A1* | 5/2018 | Witko | B02C 18/16 |
| 2018/0168398 | A1* | 6/2018 | Wang | A47J 42/40 |
| 2018/0344086 | A1* | 12/2018 | McDonough Migale | |
| | | | | A47J 42/24 |
| 2020/0187716 | A1* | 6/2020 | Ashton | A47J 42/14 |

(Continued)

FOREIGN PATENT DOCUMENTS

WO WO-2010109225 A2 * 9/2010 ............. G01F 11/24

*Primary Examiner* — Adam J Eiseman
*Assistant Examiner* — Mohammed S. Alawadi
(74) *Attorney, Agent, or Firm* — Sandy Lipkin

(57) ABSTRACT

An improved three-piece herb grinder that provides for a top portion, a base portion and a mid-portion that sits therebetween. The top portion includes an enclosed lid with a bottom portion with a cavity formed therein containing a plurality of teeth extending downwardly therefrom. The top portion has two or more magnets placed around the perimeter of the bottom portion. The mid-portion attaches to the top portion through two more corresponding magnets on the top of the mid-portion which includes an abutting flange that extends upward therefrom which includes a perimeter that fits into the cavity of the top portion, said abutting flange defining a circular area with a plurality of teeth extending upward therefrom surrounded by a plurality of holes. The abutting flange has a perimeter that includes a groove therearound for the placement therein of a sealing gasket/o-ring. The underside of the mid-portion includes those apertures that allow access to the base portion which has its own cavity surrounded by an abutting flange with a perimeter having a groove for a sealing gasket/o-ring. The base portion includes two or more magnets around the abutting flange to allow for an air tight seal. An optional basket can seat inside of the cavity of the base, said basket including a base that is mesh and optionally being separated into two or more sections.

1 Claim, 13 Drawing Sheets

(56) References Cited

U.S. PATENT DOCUMENTS

| | | | |
|---|---|---|---|
| 2020/0237158 A1* | 7/2020 | Gorodetzer | A47J 42/38 |
| 2020/0323392 A1* | 10/2020 | Pena | A47J 42/26 |
| 2020/0367695 A1* | 11/2020 | Staiano | A47J 42/34 |
| 2020/0390285 A1* | 12/2020 | Galaviz | A47J 42/24 |
| 2021/0007555 A1* | 1/2021 | Smith | A47J 42/38 |
| 2022/0015577 A1* | 1/2022 | Kelson | A47J 42/46 |

* cited by examiner

GRINDER

REFERENCE TO PRIOR APPLICATION

This application claims priority of the provisional patent application 62/875,792, filed Jul. 18, 2020 entitled GRINDER by Atilla Acar.

BACKGROUND OF THE INVENTION

Field of the Invention

The field of this invention relates generally to the field of herb grinders and more particularly toward an improved three piece grinder for herbs that includes an option basket for collection of ground herbs therein.

DESCRIPTION OF THE PRIOR ART

In herbal preparations, often the dried flower of an herb is utilized for any manner of delivery systems to the body, including smoking the herb. The dried flowers of certain herbs, like cannabis can be quite dense and difficult to break down manually into the proper small surface area required to optimize extraction of the medicinal benefits of the flower for use. For this reason, the dried flowers need to be ground down into small surface area pieces. This is often done by hand, using scissors and/or using specialized grinding machines.

Grinding machines of the prior art include basically a base portion and a lid portion that sandwich a grinding portion in between. The dried flowers are placed in the middle grinding portion which on the top consists of raised teeth set against a base with a series of apertures through which the ground flowers can pass through into a cavity in the base below. The top portion has extending therefrom from the inside a series of teeth that interact with the raised teeth of the grinding portion so that when the top portion is rotated relative to the grinding portion, the teeth grind up the dried flower and the ground flowers pieces fall through the apertures into the bottom cavity.

Typically, the grinders of the prior art are cylindrical in shape and can also then be surrounded by walls that make the exterior cubic for easier grip in rotation. Grinders of the prior art include threads on the top and the grinding portion that connect the portions. These threads can become filled with grit and dirt over time and threading the portions can become stripped making the use of the device a more difficult operation. Additionally, due to the inexact seal over time of the threads, the interior portions of the grinder are not water or air tight.

It is the object of the instant invention to provide for an improved invention that overcomes the shortcomings of the prior art.

SUMMARY OF THE INVENTION

The basic embodiment of the present invention teaches a grinder for the breakdown of dried herbal flowers containing: a top portion, said top portion having an enclosed top side and an underside said underside defining a recessed area having a plurality of downwardly protruding teeth extending downwardly therefrom wherein said underside includes at least two magnets; a grinding mid-portion said grinding mid-portion having a top side and a bottom side; said top side having a plurality of upwardly extending teeth extending upwardly therefrom and a plurality of apertures extending though said bottom side wherein there includes a cylindrical wall extending upwardly from said top side and surrounding said upwardly extending teeth and said plurality of apertures wherein said cylindrical wall includes a concentric groove therearound into which a gasket can be placed to provide an air tight seal and wherein said top side and bottom side each contain at least two magnets; a base portion wherein said base portion includes a recessed cavity around which an upwardly extending cylindrical wall extends therearound wherein said cylindrical wall includes a concentric groove therearound into which a gasket can be placed to provide an air tight seal and wherein the top side of said base portion contains at least two magnets.

The above embodiment can be modified by defining that a basket can be placed into said cavity of said base portion.

The above embodiment can be modified by defining that said basket has two or more chambers.

The above embodiment can be modified by defining that said two or more chambers have open bottoms.

The above embodiment can be modified by defining that said two or more chambers are closed with a mesh material.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
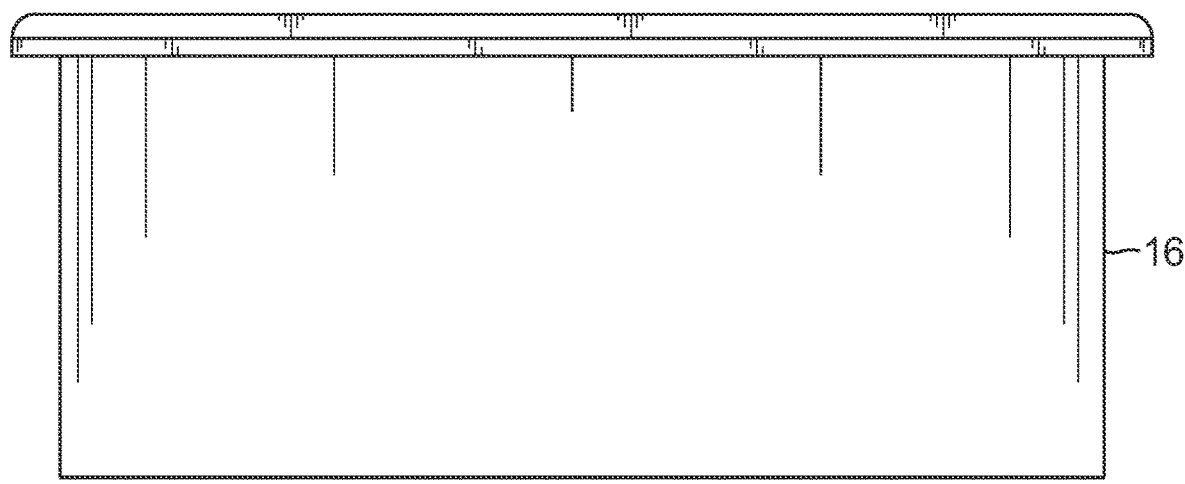
FIG. 1 is a side view of the optional basket portion for insertion into the grinder of the instant invention.

Turning to the drawings, the preferred embodiment is illustrated and described by reference characters that denote similar elements throughout the several views of the instant invention.

The preferred embodiment of the instant invention provides for an improved herb grinder 10 that includes the use of magnets to secure the pieces together thereby eliminating the threads of the prior art grinders and their propensity for becoming stripped over time and with use. Further, a groove is provided on the base portion and the grinder portion to provide a place to insert o-ring gaskets to provide an air and water tight seal of the entire grinder.

Moving from the bottom, the device 10 has a base 12 that includes a cavity 14 therein for the collection of ground herbs and that can also house an optional basket 16. Around the four corners 18A, 18B, 18C, 18D of the base 12 are a series of magnets 20A, 20B, 20C, 20D that provide for easy connection to the grinder mid-portion 22 which is likewise equipped with a series of matching magnets 24A, 24B, 24C, 24D on the underside of the bottom portion 34 of the mid-portion 22 that correspond to the magnets 20A, 20B, 20C, 20D on the base 12.

Figure 2:
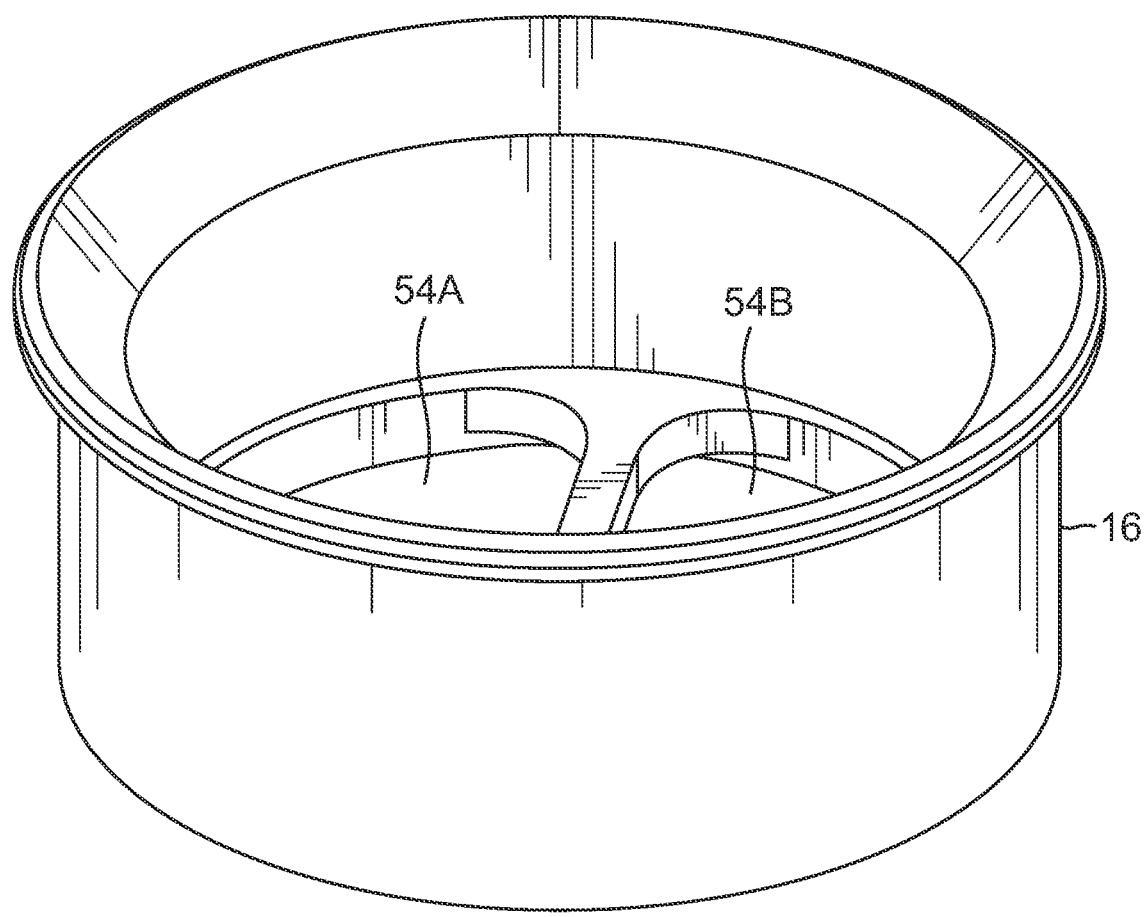
FIG. 2 is an isometric top view of the optional basket portion for insertion into the grinder of the instant invention.
Figure 3:
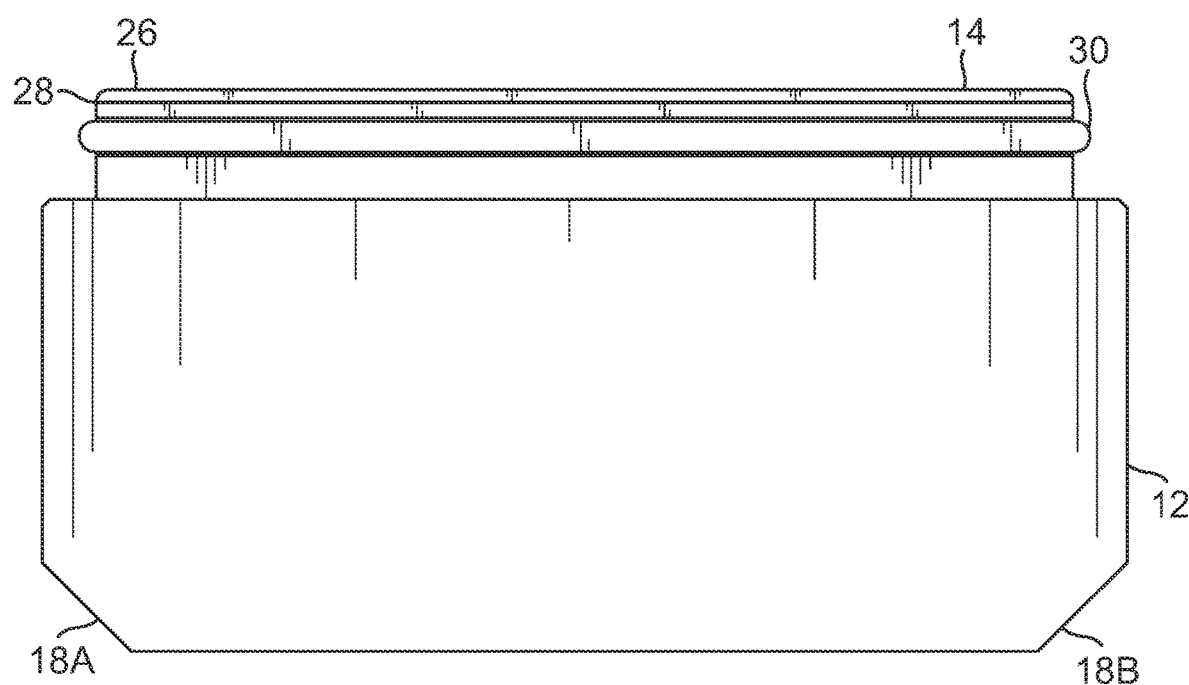
FIG. 3 is a side view of the base portion of the grinder of the instant invention.
Figure 4:
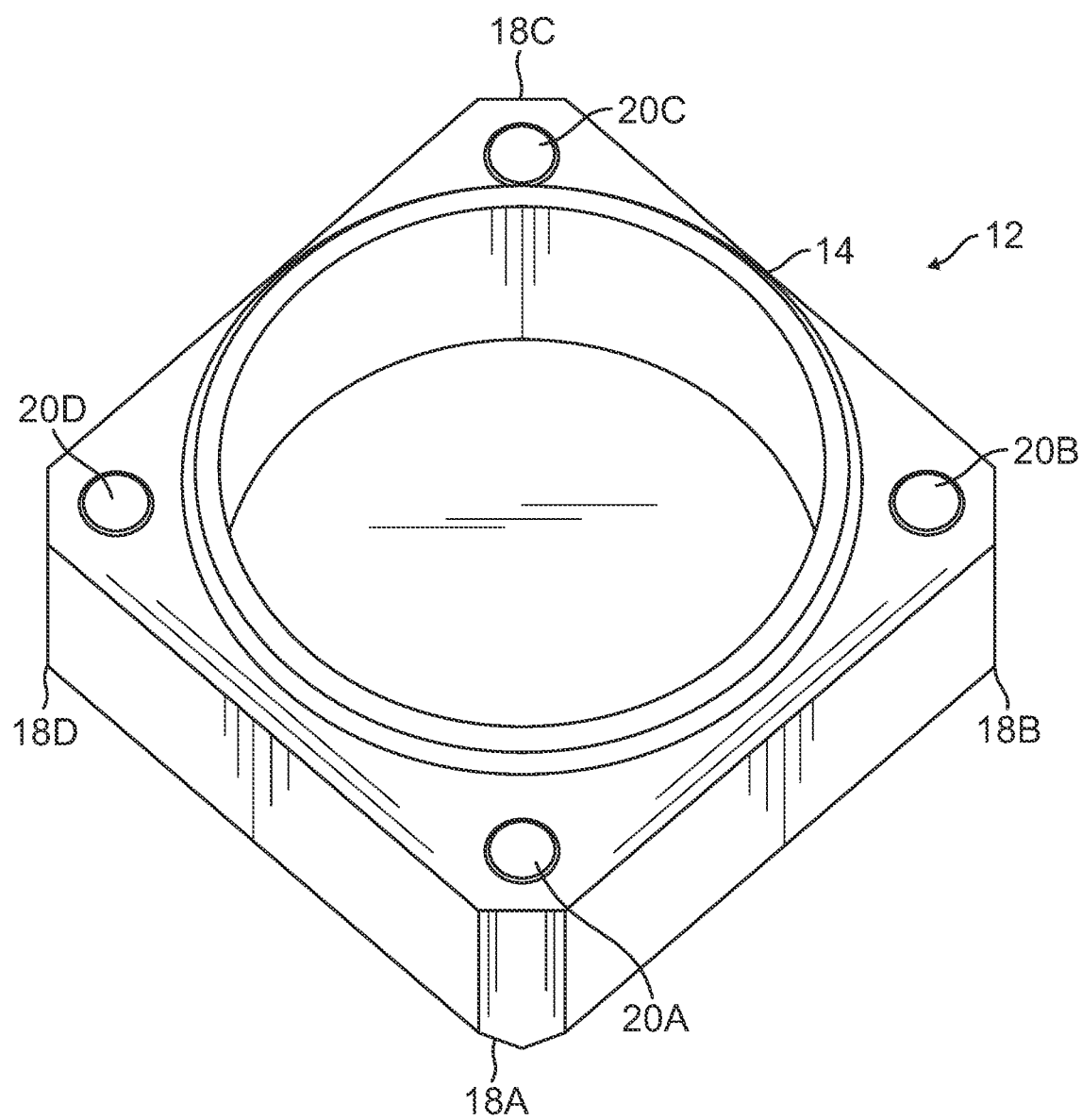
FIG. 4 is a top isometric view of the base portion of the grinder of the instant invention.
Figure 5:
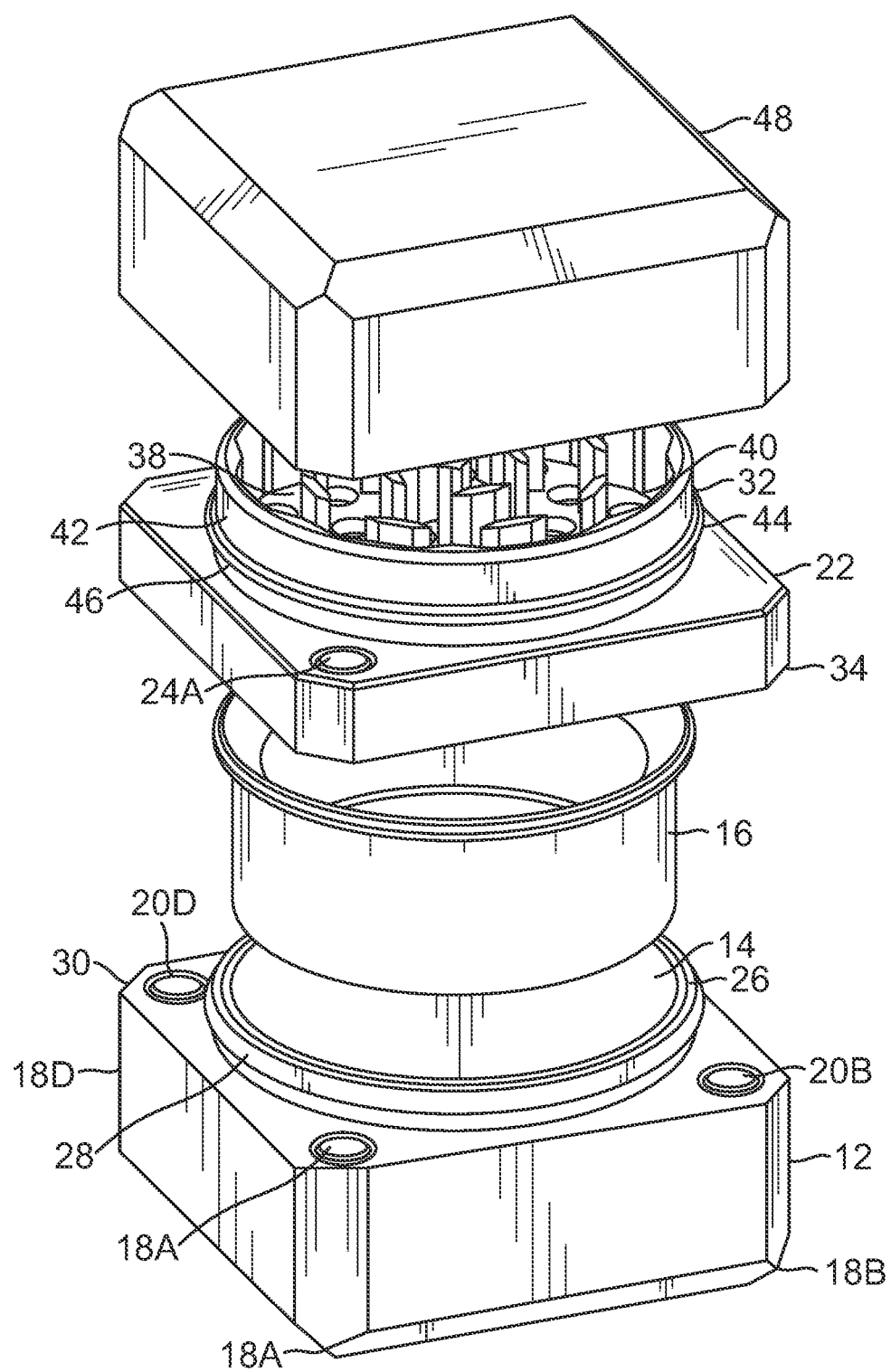
FIG. 5 is an isometric exploded view of the grinder of the instant invention.
Figure 6:
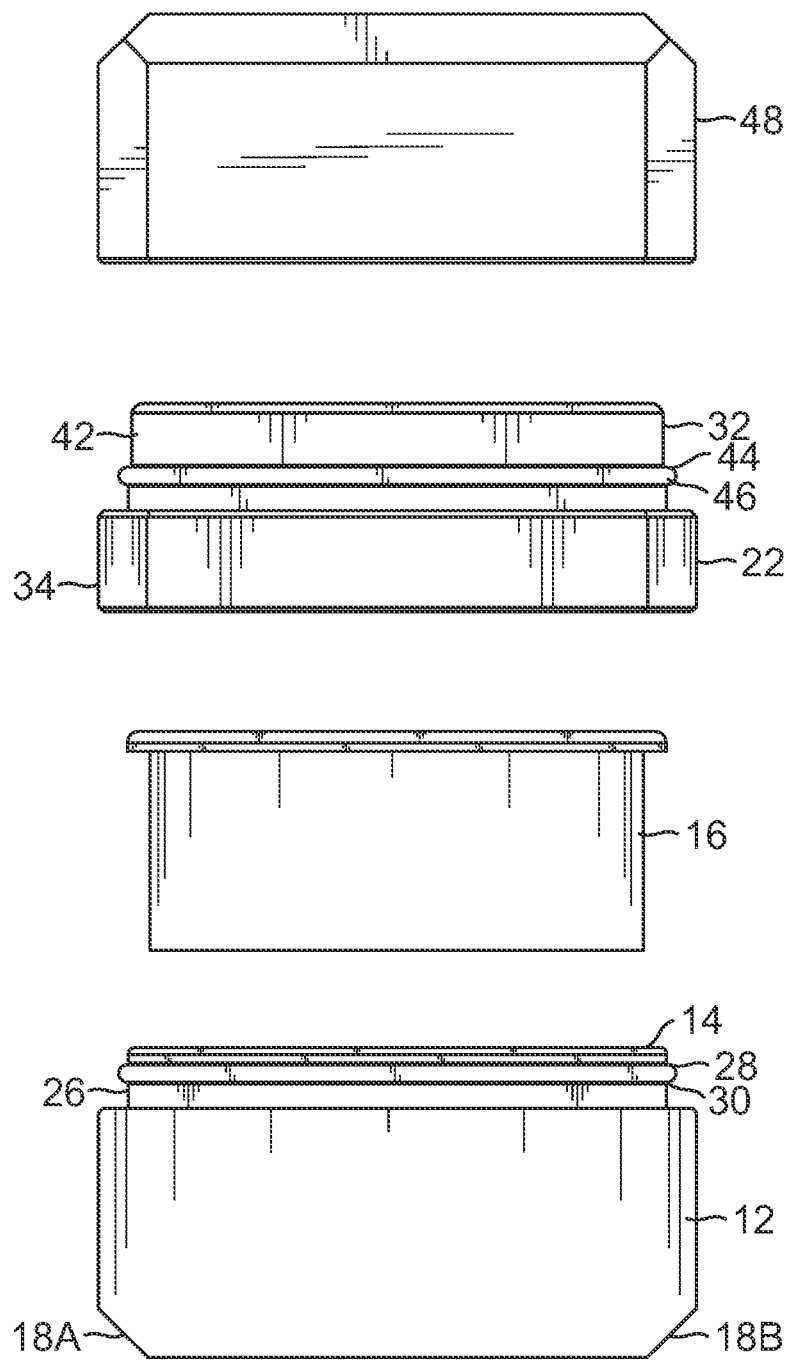
FIG. 6 is a side exploded view of the grinder of the instant invention.
Figure 7:
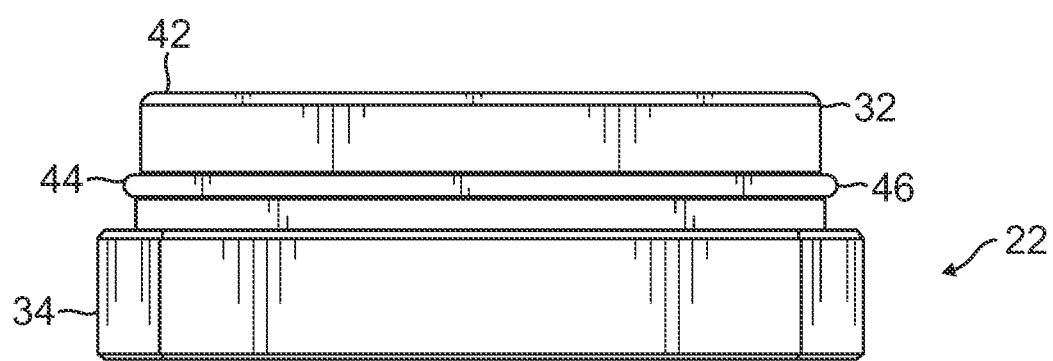
FIG. 7 is a side view of the grinder mid-portion of the grinder device of the instant invention.
Figure 8:
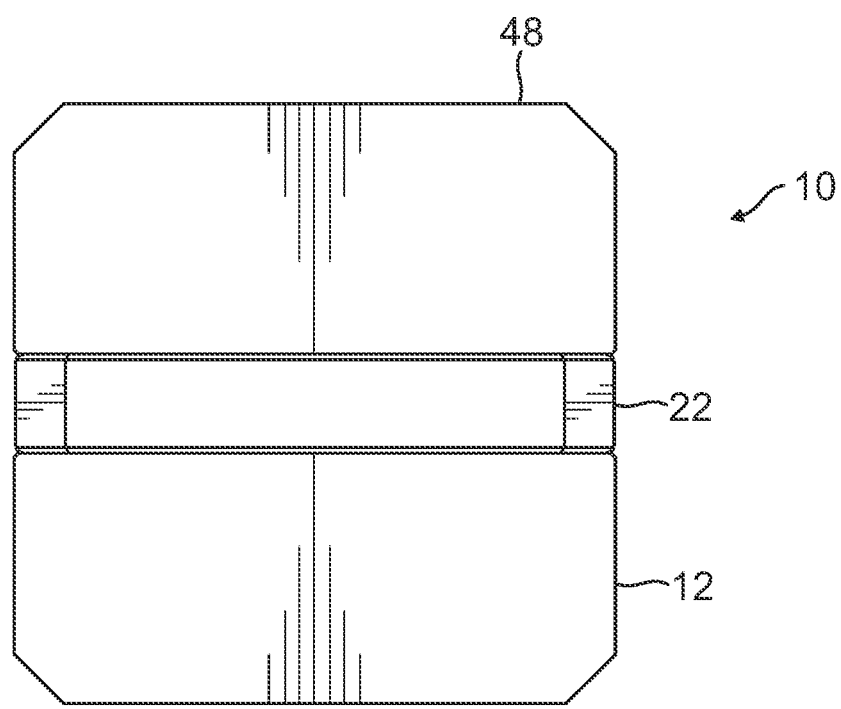
FIG. 8 is a side view of the entire device fully assembled.
Figure 9:
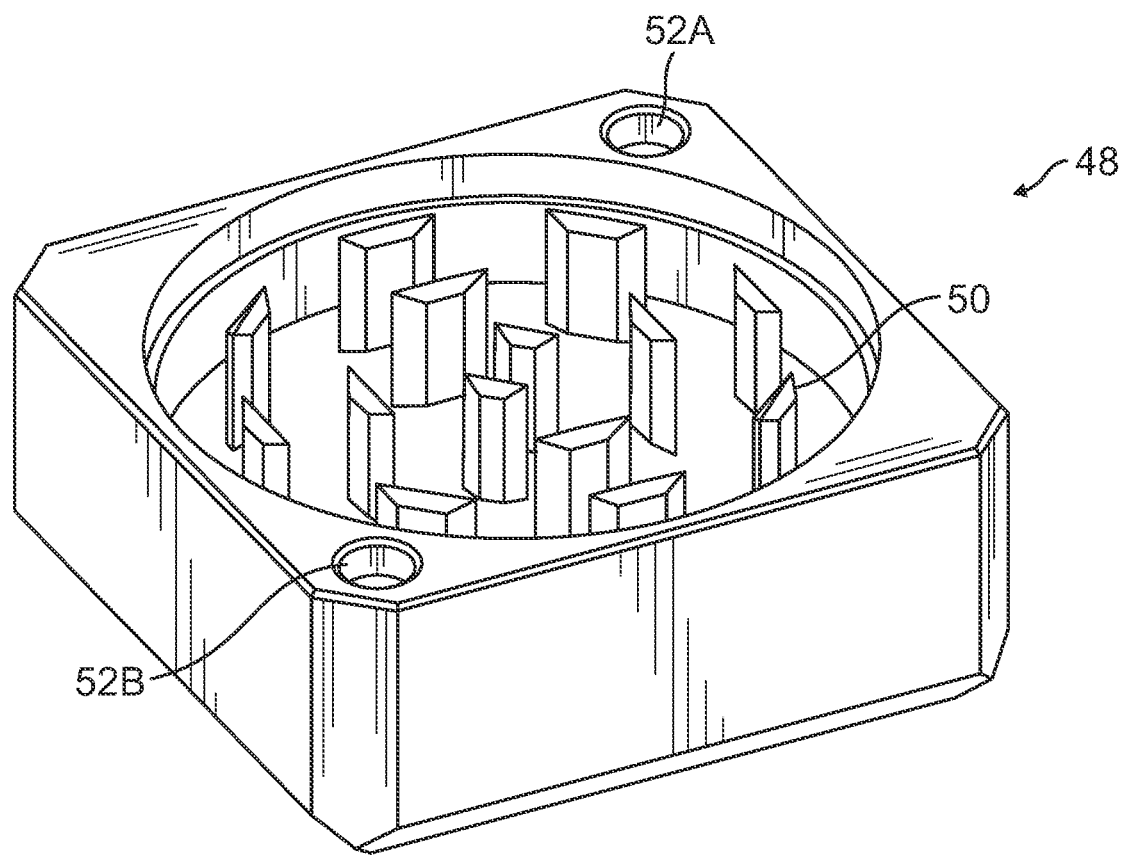
FIG. 9 is a top isometric view of the top piece, inverted, of the grinder device of the instant invention.
Figure 10:
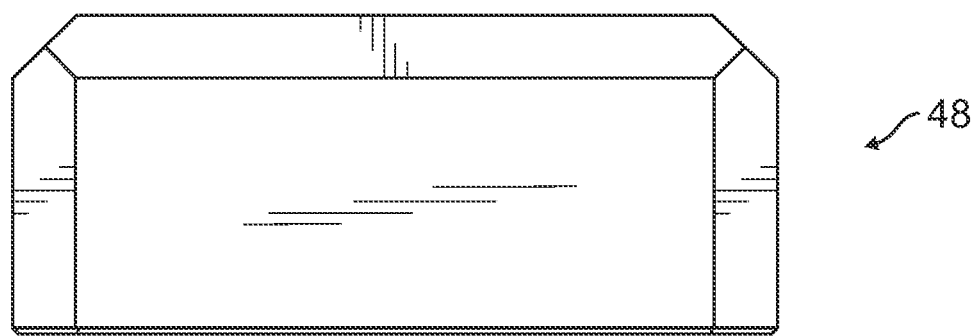
FIG. 10 is a side view of the top piece, upright, of the grinder device of the instant invention.
Figure 11:
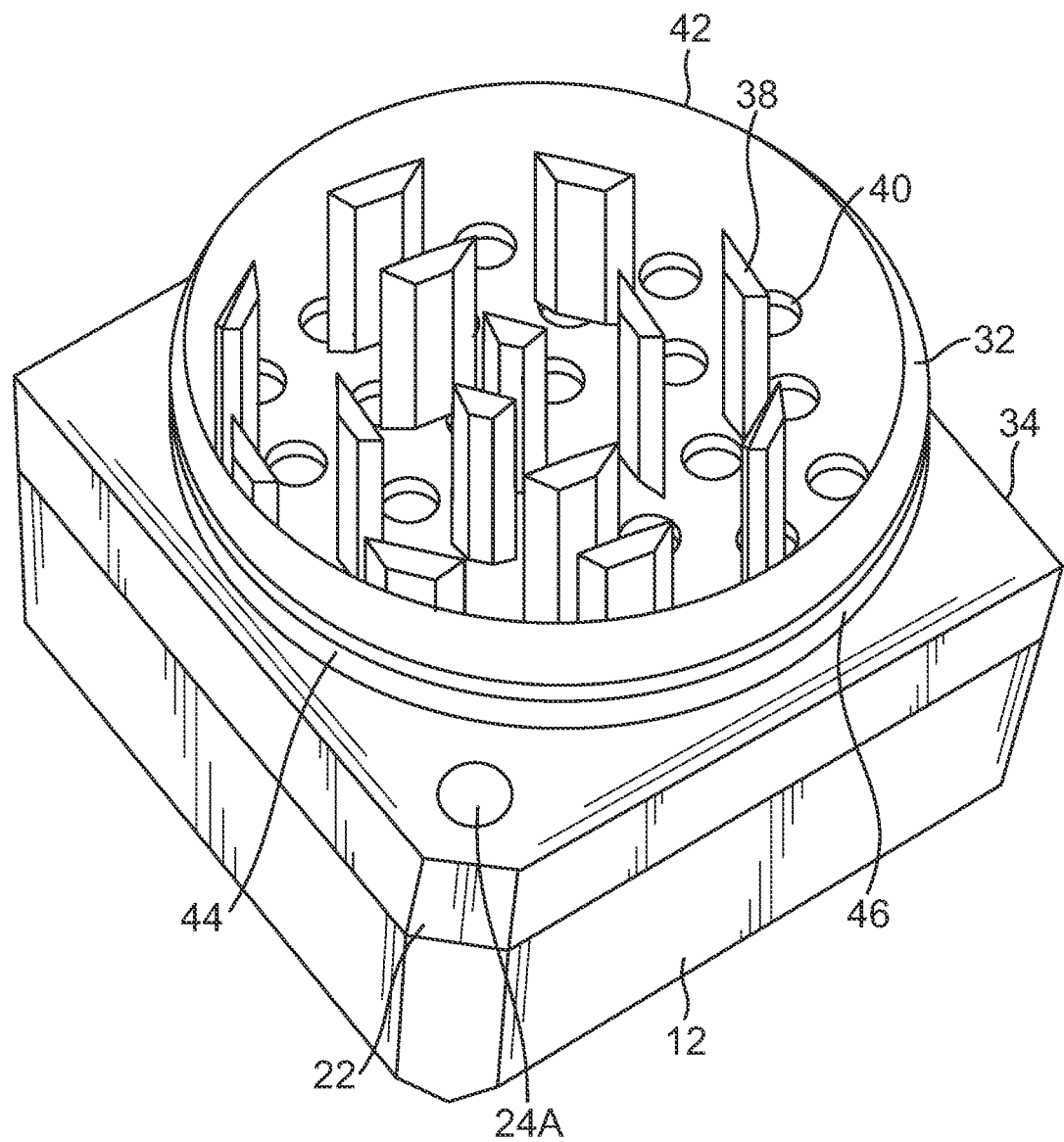
FIG. 11 is top perspective view of the base portion with the grinder portion of the device of the instant invention situated atop thereof.
Figure 12:
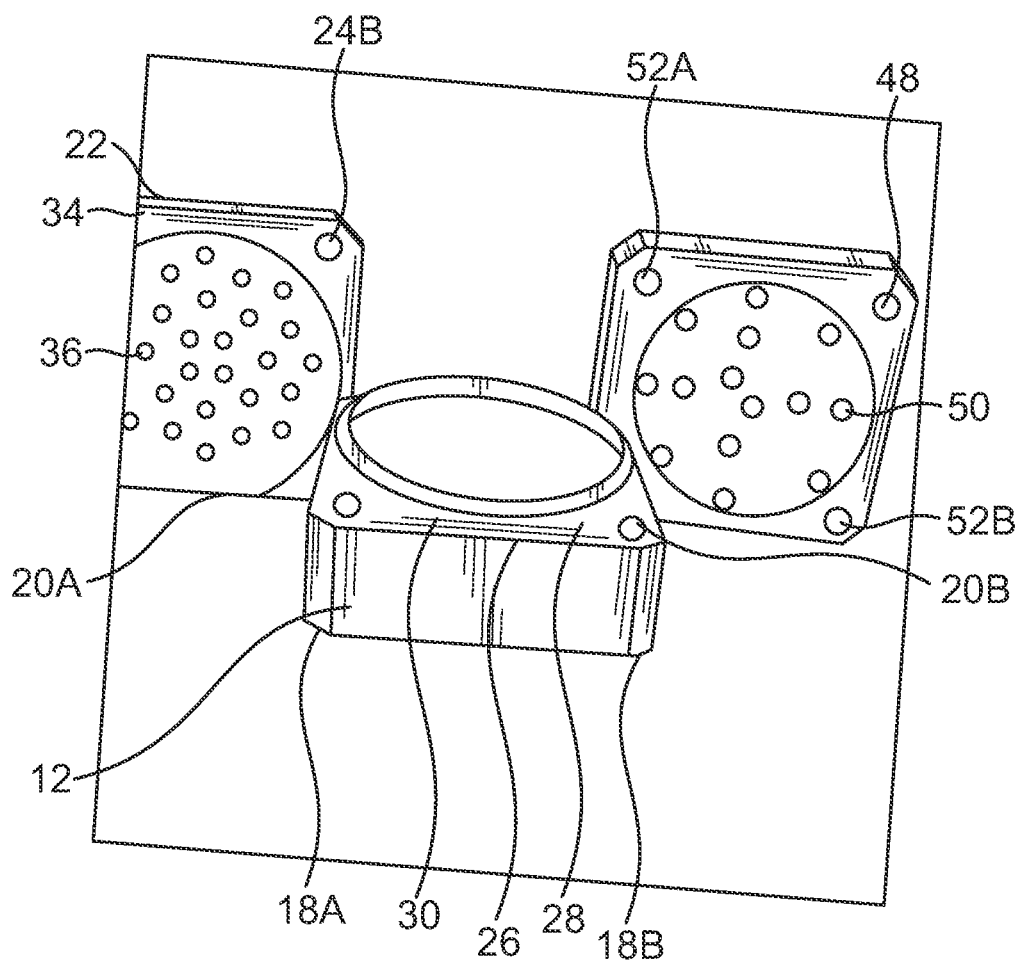
FIG. 12 shows the three main portions of the grinder of the instant invention separated including the base, the grinder mid-portion and the top portion.
Figure 13:
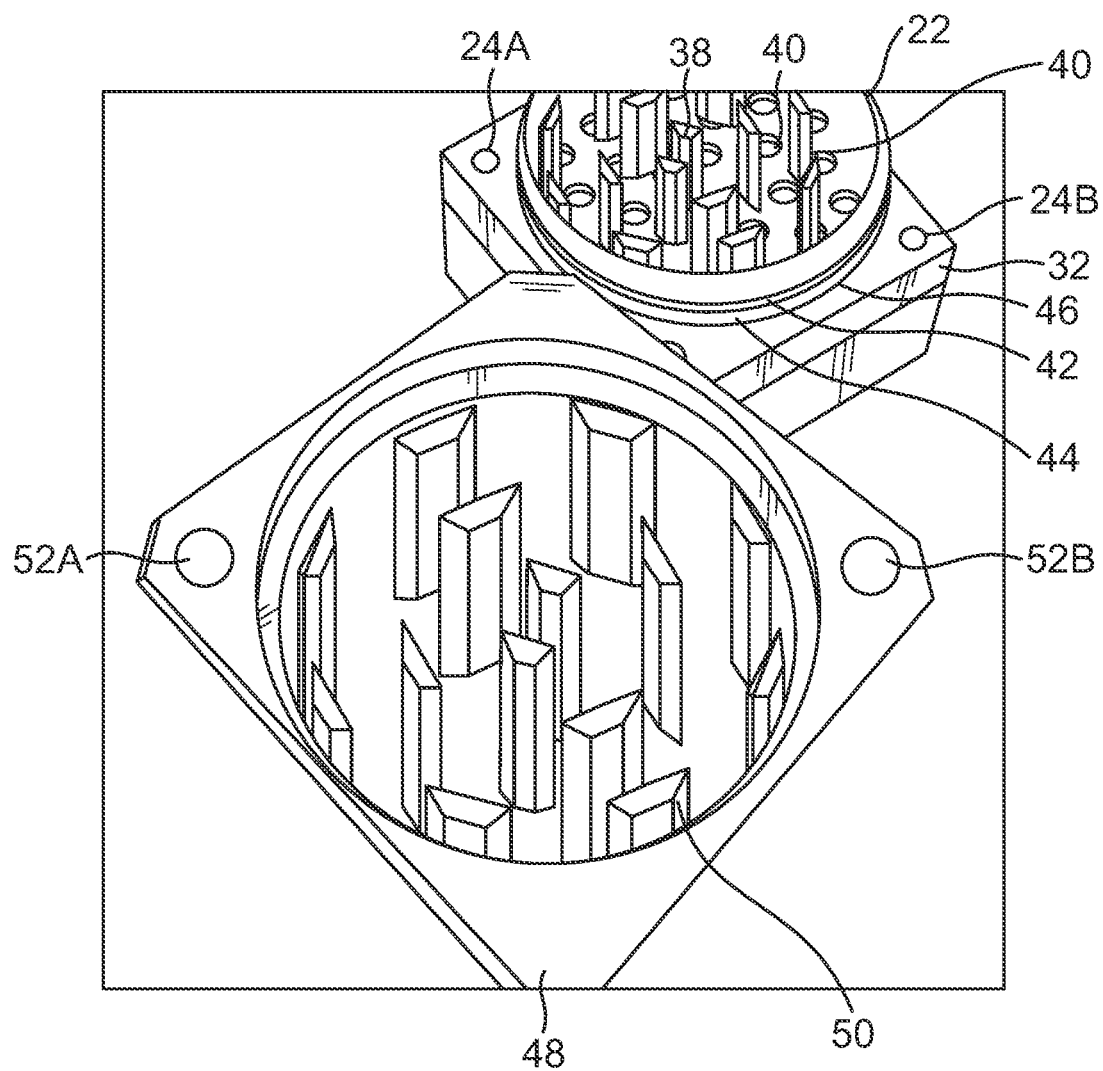
FIG. 13 shows the underside of the top portion of the grinder device of the instant invention and the top portion of the grinder mid-portion in the background.

Around the aperture cavity 14 is an upward extending perimeter wall 26 or abutting flange that can receive the basket 16 and that is engineered to contain a groove 28 into which an o-ring gasket 30 is placed for sealing. Above the base 12 is the grinder mid-portion 22 which has a top portion 32 and a bottom portion 34. The top portion 34 and bottom portion 34 includes a plurality of apertures 36, 40 through which the dried and ground flowers can pass therethrough and into the base cavity 14 or optional basket 16. The optional basket 16 can be divided into sections 54A, 54B as seen in FIG. 2 and the bottom is made of a mesh material.

The top 32 portion of the grinder mid-portion 22 includes a plurality of upwardly extending teeth 38 and a plurality of apertures 36 that correspond to the plurality of apertures 40 as seen from the bottom 34 and are essentially the same as those found on the bottom portion 34. The designated apertures 36 are as they are seen from the top whereas the designated apertures 40 are as they are seen from the bottom.

As with the base portion 12, the grinder mid-portion 22 has an upward extending perimeter wall 42 or abutting flange that surrounds the upwardly extending teeth 38 the upward extending perimeter wall or abutting flange 42 includes a concentric groove 44 therearound into which an o-ring gasket 46 is placed to complete the seal.

Finally the top portion 48 has an enclosed top and an inside bottom portion that forms a circular cavity that includes a plurality of downwardly extending teeth 50 that when combined with the upwardly extending teeth 38 of the grinder mid-portion 22 and when the top portion 48 is attached to the mid-portion 22 and rotated in the direction opposite the base portion 12, the upwardly extending teeth 38 and the downwardly extending teeth 50 work together to grind the dried flowers as the rotation occurs as gravity pulls the ground up dried flowers into the cavity 14 or basket 16 situated in the cavity 14 of the base 12 for collection therefrom. The underside of the top portion 48 also includes at least two magnets 52A, 52B around the corners of the top 48 that correspond to the at least two magnets 24A, 24B on the mid-portion 22.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A grinder for the breakdown of dried herbal flowers containing:
    a top portion, said top portion having an enclosed top side and an underside said underside defining a recessed area having a plurality of downwardly protruding teeth extending downwardly therefrom wherein said underside includes at least two magnets;
    a grinding mid-portion said grinding mid-portion having a top side and a bottom side said bottom side further including a recessed cylindrical portion; said top side having a plurality of upwardly extending teeth extending upwardly therefrom and a plurality of apertures extending though said bottom side wherein there includes a cylindrical wall extending upwardly from said top side and surrounding said upwardly extending teeth and said plurality of apertures wherein said cylindrical wall includes a concentric groove therearound into which a gasket can be placed to provide an air tight seal and wherein said top side and bottom side each contain at least two magnets;
    a base portion wherein said base portion includes a recessed cavity around which an upwardly extending cylindrical wall extends therearound and extends upward therefrom to seat into said recessed cylindrical portion of said bottom side of said grinding mid-portion wherein said cylindrical wall further includes a concentric groove therearound into which a gasket can be placed to provide an air tight seal and wherein the top side of said base portion contains at least two magnets and wherein a basket can seat into said recessed cavity of said base portion, said basket further comprising a cylindrical wall that seats into said recessed cavity in said base portion, said cylindrical wall having a bottom portion, said bottom portion containing mesh material and an open top portion, said open top portion having an abutting flange around a perimeter of said open top portion that seats into a top perimeter of said upwardly extending cylindrical wall in said base portion.

* * * * *